No. 812,771. PATENTED FEB. 13, 1906.
W. A. REDDICK.
FORK.
APPLICATION FILED APR. 25, 1905.
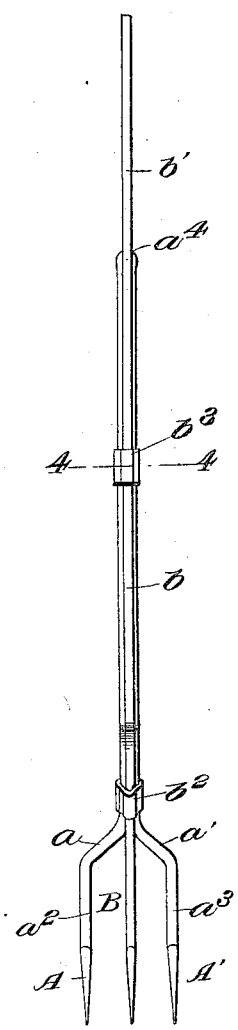
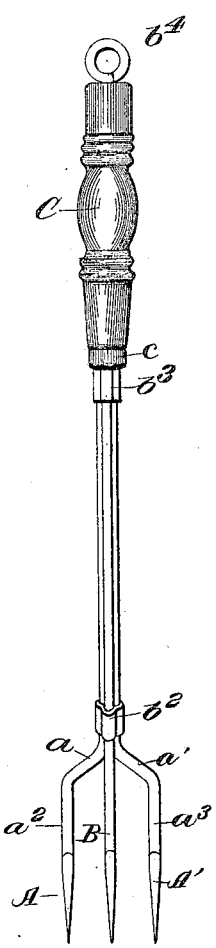
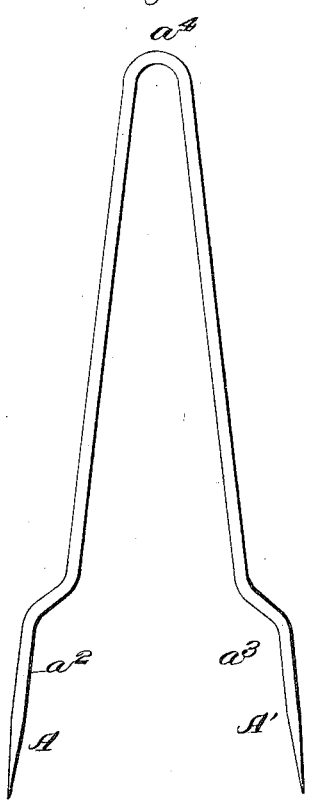
WITNESSES:
INVENTOR
William A. Reddick
BY Munn & Co.
ATTORNEYS

UNITED STATES PATENT OFFICE.

WILLIAM A. REDDICK, OF NILES, MICHIGAN.

FORK.

No. 812,771.　　　Specification of Letters Patent.　　　Patented Feb. 13, 1906.

Application filed April 25, 1905. Serial No. 257,338.

*To all whom it may concern:*

Be it known that I, WILLIAM A. REDDICK, a citizen of the United States, and a resident of Niles, in the county of Berrien and State of Michigan, have made certain new and useful Improvements in Forks, of which the following is a specification.

My invention is an improvement in forks; and it consists in certain novel constructions and combinations of parts hereinafter described and claimed.

In the drawings forming a part hereof, Figure 1 is a plan view of my invention in an advanced stage of its manufacture. Fig. 2 is a plan view of the completed fork; and Fig. 3 is a plan view of the outer tines, showing the connection between them and the manner of their formation. Fig. 4 is a cross-section on the line 4 4 of Fig 1.

My improved fork comprises outer tines A A', a central tine B, and a grip C. The outer tines A A', comprising the angular portions $a$ $a'$ and the parallel portions $a^2$ $a^3$, are formed on the ends of a wire of suitable length and size, and the wire is then bent upon itself from the central point $a^4$ until the two halves are in contact and in the same horizontal plane, the angular portions $a$ $a'$ allowing the proper degree of separation between the tines. The central tine B, formed upon a wire $b$, of suitable length, is placed in the upper groove between the contacting halves and with a part thereof $b'$ projecting beyond the doubled portion, as shown in Fig. 1. A ferrule $b^2$ is placed around the three wires at the branching of the tines and a second ferrule $b^3$ at a suitable distance above the first ferrule, and the three wires and the ferrule are afterward tinned together. The grip C, of wood or other suitable material, having a ferrule $c$ at its lower end, is slipped upon the projecting portion $b'$ of the wire $b$ until it rests upon the ferrule $b^3$ surrounding the wires. The grip C is of such length that a sufficient portion of the wire $b$ projects therethrough to form a ring $b^4$ to secure the grip on the wire and to provide a convenient means for hanging up the fork.

It will be obvious from the above description that I provide a fork of simple construction, yet possessing great strength and durability. The ring, while providing a simple and inexpensive means for securing the grip in place, possesses the additional utility of being a convenient means for suspending the fork, and as a suspending means the rigid ring integral with the fork is much superior to the ring as ordinarily constructed.

Having thus described my invention, what I claim as new, and desire to secure by Letters Patent, is—

1. In a fork the combination of a wire doubled upon itself to form a handle and two tines, an intermediate wire provided with a tine, arranged between and upon the parallel wires, and of greater length than the doubled portion, a ferrule binding the wires at the branching of the tines, a second ferrule binding the wires near the opposite end of the doubled portion, a grip encircling the doubled portion and resting on the ferrule, and a ring bent in the extended portion of the intermediate wire for securing the grip in place.

2. In a fork the combination of a wire doubled upon itself to form a handle and two tines, an intermediate wire having a tine arranged between the parallel wires, and extending beyond the doubled portion, means for securing the wires together, a grip encircling the wires, and a ring in the extended portion of the intermediate wire for retaining the grip upon the wires.

3. In a fork the combination of a wire doubled upon itself to form a handle and two tines, an intermediate wire provided with a tine, arranged between the parallel wires and extending beyond the doubled portion, means for securing the wires together, and a ring in the extended portion of the intermediate wire.

4. In a fork the combination of a wire doubled upon itself to form a handle and two tines, an intermediate wire provided with a tine arranged between the parallel wires and extending beyond the doubled portion, a grip on the handle, and a ring integral with the intermediate wire and beyond the handle.

5. In a fork, the combination of a wire doubled upon itself to form a handle, and two tines, an intermediate wire provided with a tine and arranged between the parallel wires of the doubled portion, means for securing the wires together, a grip mounted on the handle and a ring integral with one of the wires for retaining the grip on the handle.

6. In a fork, the combination of a plurality of wires, each provided with a tine, and uniting to form a handle, a grip on the handle, and a ring integral with one of the wires for retaining the grip on the handle.

7. A fork comprising a plurality of wires, each provided with a tine, a grip mounted around the wires, and a ring integral with one of the wires for retaining the grip upon the wires.

8. A fork comprising a longitudinally-perforated grip, a plurality of wires, each provided with a tine, and passing through the grip and a ring formed from one of the wires, beyond the grip, to retain said grip in place upon the wires.

9. The combination of a tubular handle, a rod or tang passed through said handle and bent at the upper end of the latter and exterior thereto into ring form, substantially as set forth.

WILLIAM A. REDDICK.

Witnesses:
K. L. REDDICK,
THOS. E. CAIN.